Aug. 22, 1939.   J. C. DIONNE ET AL   2,170,515
SENSITOMETER
Filed Feb. 8, 1936
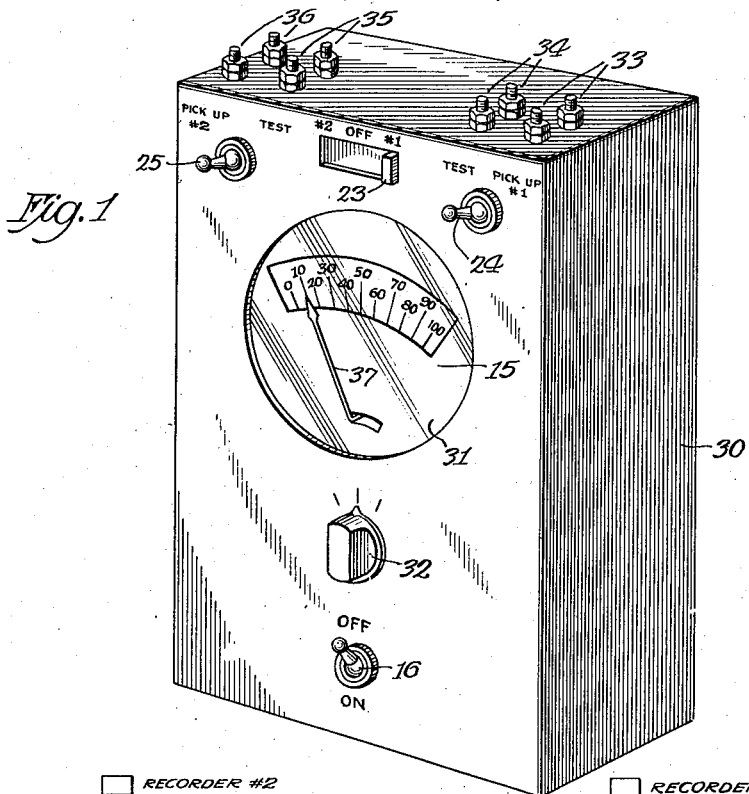
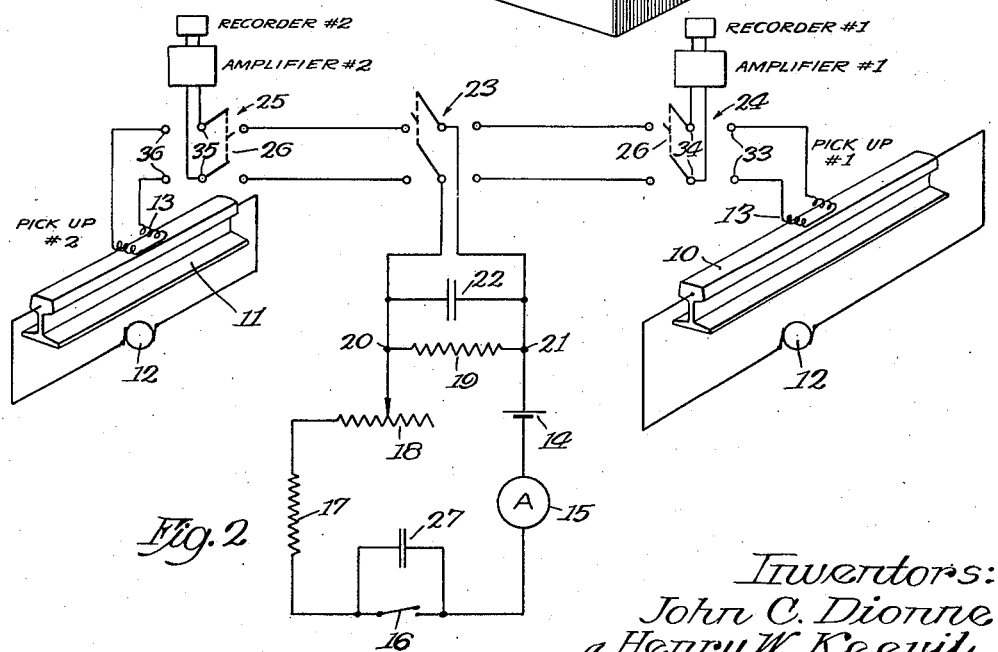
Inventors:
John C. Dionne
Henry W. Keevil
By Gillson, Mann & Cox
Attys.

Patented Aug. 22, 1939

2,170,515

UNITED STATES PATENT OFFICE 2,170,515

SENSITOMETER

John C. Dionne, Somerville, Mass., and Henry W. Keevil, Highland Park, Ill.

Application February 8, 1936, Serial No. 62,935

6 Claims. (Cl. 175—183)

This invention relates to a device for quickly checking the sensitivity of an amplifier, relay or other electrical apparatus.

Further and other objects and advantages will become apparent as the disclosure proceeds and the description is read in conjunction with the accompanying drawing, in which:

Fig. 1 is a perspective view of a sensitometer made in accordance with this invention; and Fig. 2 is a diagrammatic view of the electrical circuit and parts associated therewith.

For the purpose of complying with section 4888 of the revised statutes, a preferred embodiment of the invention has been chosen for illustration and description, but it will be understood that the appended claims are not limited by the details of the embodiment shown and described unless required by the prior art.

There are many cases in which it is desirable to quickly check the sensitivity of a particular piece of electrical apparatus, such as a relay, an amplifier, etc. This is particularly true in detecting flaws in railroad track because as the conditions of the track change, it is necessary to make corresponding changes in the sensitivity of the detecting apparatus.

The use of the sensitometer in conjunction with flaw detecting apparatus is shown diagrammatically in Fig. 2, and for convenience in explaining the electrical circuit of the sensitometer, it will be described with particular reference to this use.

Referring now to Fig. 2, the reference characters 10 and 11 refer to the rails of a track, each rail being suitably energized by a direct current generator 12 adapted to pass at low voltage, high amperage current through the rail. The passage of the current through the rails sets up an electromagnetic field surrounding them and pickup units comprising oppositely connected detector coils 13, are adapted to move over the surface of the rails and detect variations in the magnetic flux caused by flaws or other defects in the rail. When the pickup unit traverses a field of greater or lesser intensity than the normal field, a current is induced in the coils, which is suitably amplified and recorded.

Since the method of flaw detection constitutes no part of this invention and is used merely to show environment in which the sensitometer may advantageously be used, further description is deemed unnecessary.

As a matter of convenience, the pickup unit, amplifier and recorder associated with the rail 10 will be referred to as pickup No. 1, amplifier No. 1 and recorder No. 1 and the corresponding units associated with the rail 11 will be referred to as pickup No. 2, amplifier No. 2 and recorder No. 2.

The electrical circuit for the sensitometer includes a source 14 of electro-motive force (which may be a 1.5 volt, dry-cell battery), a milliammeter 15 (preferably Weston Model 301 milliammeter reading from 0 to 1 milliampere, a product of Weston Electrical Instrument Co., Newark, N. J.), a snap switch 16 (preferably a toggle switch of the type used in radio work, as, for example, Arrow H—H toggle switch, catalogue No. 6060, a product of Arrow-Hart-Hegiman Electric Co., 701 W. Jackson Blvd., Chicago, Illinois), a resistance 17 (preferably 1500 ohms, 1 watt), a variable rheostat 18 (preferably having a maximum resistance of 25,000 ohms), and a resistance 19 (preferably 50 ohms, 1 watt), all of these elements being connected in series. Obviously when the switch 16 is closed, a potential difference is established between the ends 20 and 21 of the resistance 19, and the surge of current through the circuit when the switch is closed gives a particular wave form representing the change in the potential difference between the points 20 and 21. The purpose of the sensitometer is to produce a known voltage change across the resistance 19 and then apply it to the electrical apparatus whose sensitivity is to be checked.

Since the wave form at the output of the amplifier produced by the pickups when traversing the electro-magnetic field in the region of a flaw is substantially a sine curve, it is desirable to have the voltage wave produced by the sensitometer of approximately the same form when it leaves the amplifier. Since the electrical circuit which has thus far been described, sets up a voltage wave, the length of which is somewhat shorter than that produced by the pickups, a condenser 22 is connected across the resistance 19 to lengthen the wave and produce a wave form which more nearly approximates that produced by the pickup coil (preferably the condenser 22 has a capacity of two microfarads).

A double-pole, double-throw switch 23 enables the sensitometer to be connected selectively to either amplifier and other double-pole, double-throw switches 24 and 25 enable the amplifiers to be selectively connected either to the pickup units or to the sensitometer. Obviously, when the switch handles, generally designated 26 of the switches 24 and 25, are moved outwardly, the amplifiers are connected to the pickups and when the handles are thrown inwardly, the amplifiers are disconnected from the pickup units and may be selectively placed in circuit with the sensitometer by proper manipulation of the switch 23.

It is not essential that the switches 24 and 25 be provided because the amplifiers may be tested by connecting the sensitometer in parallel with the pickups but the results are not quite as accurate.

The resistance 17 in the sensitometer circuit limits the amount of the current which may flow through the circuit when the resistance of the potentiometer is entirely cut out and thereby acts to protect the milliammeter from overload.

A condenser 27, preferably of one microfarad capacity, is connected across the switch 16 to suppress high frequency surges of current through the circuit at the instant when the switch 16 is opened or closed.

The sensitometer is housed within a cabinet or casing 30 having a window 31 in its front face through which the milliammeter 15 is exposed. The variable rheostat 18 is preferably mounted within the cabinet so that the control knob 32 is beneath the ammeter 15. The switches 16, 23, 24 and 25 are conveniently located on the front face of the cabinet as shown in Fig. 1.

A plurality of binding posts are provided on the top wall of the casing for connecting the sensitometer to the amplifiers and pickups, the binding posts 33 being adapted to be connected to pickup No. 1, binding posts 34 to amplifier No. 1, binding posts 35 to amplifier No. 2 and binding posts 36 to pickup No. 2.

In using the sensitometer, each amplifier is first adjusted (by means of the grid bias or any other conventional manner) so that it is sensitive enough to pick up and enable the recording apparatus to record fissures of known size. The sensitometer is then calibrated to that setting of the amplifier by adjusting the rheostat 18 until the closing of the switch 16 will just barely cause the recorder to operate. A standard is thereby established for setting the amplifier to greater or less sensitivity.

To make a test of amplifier No. 1, the switches are thrown to the position shown in Fig. 1, that is, with the switch 24 to the left and the switch 23 to the right so that the sensitometer is connected to the amplifier. The switch 16 is then moved to "on" position and the current through the circuit is adjusted by moving the control knob of the rheostat 18 until the current through the circuit, as indicated by the needle 37 of the ammeter, is of some known predetermined strength, (represented by the figure 10, for example, on the meter scale). The switch 16 is then turned off and immediately turned on again. If this operation causes the recorder to operate, the sensitivity of the amplifier is reduced by suitable adjustment and the test is repeated until the manipulation of the switch 16 just barely causes the recorder to operate. The amplifier is then at the proper setting for sensitivity to an input wave represented by the arbitrary figure 10.

To set the amplifier for a sensitivity of 20 or any other value, a similar procedure is followed.

While it is preferable to use the making of the electrical circuit in testing for sensitivity, it will be understood that the opening of the electrical circuit by the switch 16 bears a functional relationship to the system which enables it to be used as a criterion if desired.

We claim as our invention:

1. In a sensitometer, a casing, an electric meter in the casing having an exposed meter face, an electrical circuit associated with the meter including a source of electromotive force, a switch and a resistance across which a given potential difference is adapted to be established upon manipulation of the switch, said resistance being adapted to be connected to an electrical device whose sensitivity is to be tested, and a condenser connected across the resistance.

2. In a sensitometer, a casing, an electric meter in the casing having an exposed meter face, an electrical circuit associated with the meter including a source of electromotive force, a switch and a resistance across which a given potential difference is adapted to be established upon manipulation of the switch, said resistance being adapted to be connected to an electrical device whose sensitivity is to be tested, and a condenser connected across the switch.

3. A sensitometer for use with flaw detecting apparatus including an induction coil and an amplifier associated with the coil, said sensitometer comprising a casing, an electric meter in the casing having an exposed meter face, an electrical circuit associated with the meter including a source of electro-motive force, a switch and resistance across which a given potential difference is adapted to be established upon manipulation of the switch, and a condenser connected across the resistance and having a capacity which produces a voltage wave-form across the resistance which corresponds substantially with the voltage wave-form across the induction coil of the flaw detecting apparatus whenever a flaw is encountered.

4. For use in a device of the class described, an electrical circuit comprising a source of electro-motive force connected to a resistance, a switch for disconnecting the electro-motive force from the resistance, means for connecting the resistance to electrical apparatus, the sensitivity of which is to be tested, and a condenser connected across the resistance.

5. In a sensitometer, a casing, an electric meter in the casing having an exposed meter face, an electrical circuit associated with the meter including a source of electro-motive force, a switch and a resistance across which a given potential difference is adapted to be established upon manipulation of the switch, a condenser connected across the resistance, and a second condenser connected across the switch.

6. For use with flaw detecting apparatus of the type including a detector coil, a thermionic amplifier and an indicator operatively connected to the output of the amplifier, a sensitometer adapted to test the sensitivity of the amplifier comprising an electrical circuit having a source of uni-directional electromotive force, a switch for opening the circuit, means for controlling the flow of current through the circuit, a resistance across which a given potential difference is adapted to be established upon manipulation of the switch, means for controlling the form of the voltage wave across the resistance, and means for connecting the input of the amplifier to opposite sides of the resistance whereby manipulation of the switch sends an impulse of known value and of approximately the same wave form as a flaw impulse through the amplifier whereby the observed action of the indicator indicates the sensitivity of the amplifier.

JOHN C. DIONNE.
HENRY W. KEEVIL.